United States Patent [19]

Berghaus et al.

[11] 4,322,112
[45] Mar. 30, 1982

[54] ADJUSTABLE HINGE MOUNT FOR A MOTOR VEHICLE SEAT

[75] Inventors: Klaus Berghaus, Wuppertal; Gerhard Lehmann, Remscheid; Hans-Joachim Berghof, Remscheid; Hans-Jürgen Honecker, Remscheid, all of Fed. Rep. of Germany

[73] Assignee: Keiper Automobiltechnik GmbH & Co. KG, Remscheid, Fed. Rep. of Germany

[21] Appl. No.: 64,392

[22] Filed: Aug. 6, 1979

[30] Foreign Application Priority Data

Aug. 7, 1978 [DE] Fed. Rep. of Germany ....... 2834529

[51] Int. Cl.³ .............................................. A47C 1/025
[52] U.S. Cl. ...................................... 297/362; 297/355
[58] Field of Search ............... 297/362, 361, 373, 366, 297/367, 355; 16/139, 143

[56] References Cited

U.S. PATENT DOCUMENTS

| | | |
|---|---|---|
| 3,432,881 | 3/1969 | Putsch et al. .................. 297/366 X |
| 3,570,800 | 3/1971 | Cycowicz ......................... 248/415 |
| 4,195,884 | 4/1980 | Muhr et al. ..................... 297/355 X |

FOREIGN PATENT DOCUMENTS

| | | |
|---|---|---|
| 1680127 | 11/1971 | Fed. Rep. of Germany ...... 297/362 |
| 2041302 | 2/1972 | Fed. Rep. of Germany ...... 297/362 |

*Primary Examiner*—William E. Lyddane
*Attorney, Agent, or Firm*—Michael J. Striker

[57] ABSTRACT

The adjustable hinge mount for motor vehicle seats having a reclinable seat back comprises means for holding respective hinge members of the mount in a fixed axial position. The holding means comprises a bearing shield supported for rotation on the rotary axle interconnecting the two hinge members. The rim portions of the shield above the rotary axle and on the level of the latter are connected to the outer hinge member assigned to the seat back in such a manner that substantially no axial play takes place. The lower range of the outer hinge member is secured against axial play by means of a Z-shaped guiding plate integrally connected to the hinge member assigned to the seat proper.

4 Claims, 6 Drawing Figures

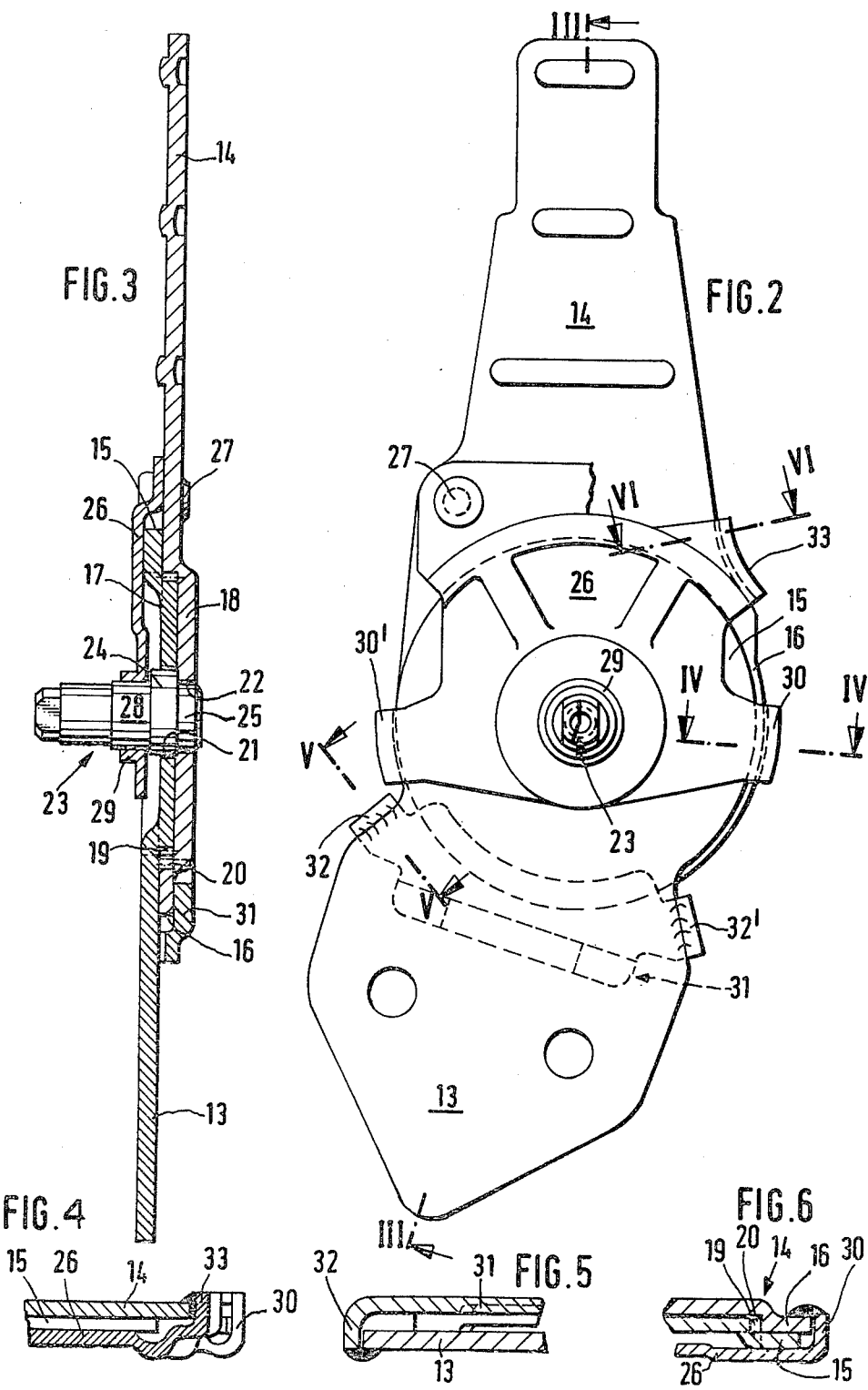

ADJUSTABLE HINGE MOUNT FOR A MOTOR VEHICLE SEAT

BACKGROUND OF THE INVENTION

This invention relates generally to an adjustable hinge mount for seats having reclinable seat backs, particularly for motor vehicle seats. More particularly, this invention relates to a hinge mount having a hinge member connectable to the seat part and a hinge member connectable to the seat back, the two hinge members being interconnected by a rotary axle whereby the position of the two hinge members being adjusted by a wobble gear assembly, including an eccentric portion on the rotary axle which drives the gears of the assembly and thus adjusts and locks the position of the seat back relative to the seat part.

In the known hinge mount of the aforedescribed type, the axial unity of the two hinge members and of the adjusting and locking device connected thereto is effected by holding means in the form of a cover plate profiled into a Z-shaped configuration, which adjoins a hinge member and is fastened, for example by riveting, at its marginal zone to the other hinge member. The spacing of the parallel arms in such conventional holding means, however, are different due to unavoidable manufacturing tolerances. Since for the sake of movability of the two hinge members relative to each other the distance between the two parallel arms of the Z-shaped holder is anyhow slightly larger than the thickness of the wall of the hinge member surrounded by the holder, there results a more or less large axial play between the two hinge members. In the event of an excessive axial play, the teeth of the wobble gear assembly forming the adjusting device for the hinge members do not securely engage each other over the entire width of their teeth. This insufficient engagement is particularly disadvantageous in the case when the walls of respective hinge members are shaped by embossing the individual gears of the wobble gear assembly about the required width of the gear teeth. For reasons of saving material in the construction of the hinge mount of this type, it is desirable that the thickness of the walls of respective hinge members be selected near the allowable limits. Such material saving construction necessitates, however, that the teeth formed in the walls of the hinge members always remain in engagement with one another over their entire width so that the danger of a tooth rupture resulting in the breakage of the hinge mount could not occur.

In another known hinge mount of this type, the holding means for establishing the unity of the two hinge members consist of set bolts secured by riveting or welding to one hinge member and engaging with their heads a marginal zone of the other hinge member. Even in this type of holding means the clearance between the head of the set bolt and the surface of the hinge members supporting the set bolts must be made a little larger than the thickness of the wall of the other hinge member engaged by the set bolts so that a free movement of the two hinge members relative to each other could take place. For this reason also in this known solution the existing axial play does not guarantee the engagement of the teeth of wobble gears over the entire tooth width. As mentioned above, this incomplete engagement is disadvantageous particularly in the case when the width of the teeth is selected such that the permissible transmission forces lie near the lower limit of the strength of the gears. Consequently, even in this known solution there still remains the danger of breakage of the teeth of the wobble gears, particularly in the case of an accident and the adjusted position of the seat back is not completely secured.

SUMMARY OF THE INVENTION

It is, therefore, a general object of the present invention to overcome the aforementioned disadvantages.

More particularly, it is an object of the invention to provide an improved hinge mount for vehicle seats of the above-described type in which the individual hinge members are arranged side-by-side in a substantially play-free condition so that the engagement of the teeth of the wobble gears is maintained over the entire width of the teeth.

In keeping with these objects, and others which will become apparent hereafter, one feature of the invention resides, in a hinge mount having means for holding the hinge members on the rotary axle in a fixed axial position relative to each other, in a combination which comprises a bearing shield slidably adjoining substantially without axial play a surface of one hinge member, one rim portion of the bearing shield being secured to the other hinge member and the opposite rim portion of the shield bearing on the axle for common rotation with the other hinge member. Due to the unilateral fixed connection of the bearing shield to one of the hinge members, it is possible to provide a substantially play-free contact in the axial direction between the bearing shield and the facing surface of the other hinge member. As a result, the wobble gears formed on respective hinge members remain in mesh with one another over the entire width of their teeth. Accordingly, the exact dimensioning in the design of the hinge members can be dispensed with and the thickness of the wall of the hinge members can be constructed according to the actual requirements and consequently savings of material and a more compact construction of the hinge mount will result.

In order to insure the axial symmetry of the bearing shield, the portions of the hinge members around the rotary axle have a circular configuration and two diametrical rim portions of the bearing shield are bent over the circumference of the other hinge member. The two bent rim portions of the bearing shield are preferably situated on the level of the rotary axle.

According to still another feature of this invention, a substantially play-free axial arrangement of the hinge member connected to the seat proper and projecting into the interspace between the other hinge member connected to the seat back and the bearing shield is attainable by securing, for example by welding, the ends of the diametrically opposed bent rim portions of the bearing shield to the peripheral portions of the assigned hinge member for the seat back. To insure the play-free connection of the bearing shield to the assigned hinge member, both hinge members together with the bearing shield are compressed with a predetermined force and this compressed condition the diametrically oposed angular rim portions of the bearing shield are welded to the periphery of the assigned outer hinge member. In this manner, any axial play between the two hinge members and the bearing shield is substantially eliminated.

According to still another feature of this invention, a guiding member is firmly connected to the hinge member secured to the seat part, the guiding plate having its free end in sliding engagement with the rim portion of the circular part of the hinge member secured to the seat back. In this manner, the circular parts of both hinge members around the rotary axle are held together practically without any axial play over the entire range of their relative movement. The guide plates have preferably a Z-shaped cross-section whereby one parallel arm slidably engages the rim portion of one hinge member and the other parallel arm is secured by welding to the other hinge member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a side view of the hinge mount of FIG. 1 as seen from the actuation side and illustrating the bearing shield of this invention secured to the upper hinge member either by riveting (left-hand side) or by welding; (right-hand side)

FIG. 3 is a sectional front view of the hinge mount of FIG. 2 taken along the line III—III;

FIG. 4 is a sectional top view of a cut-away portion of the hinge mount of FIG. 2 taken along the line IV—IV and illustrating the connection of the bearing shield of this invention to the outer rim of the hinge member assigned to the seat back;

FIG. 5 is a sectional top view of a portion of the hinge mount of FIG. 2 taken along the line V—V and illustrating the connection of a guiding plate to the hinge member assigned to the seat part; and FIG. 6 is a modification of the welding connection of the bearing shield to the periphery of the circular portion of the hinge member assigned to the seat back taken along the line IV—IV of FIG. 2.

DESCRIPTION OF THE PREFERRED EMBODIMENTS

Figure 1:
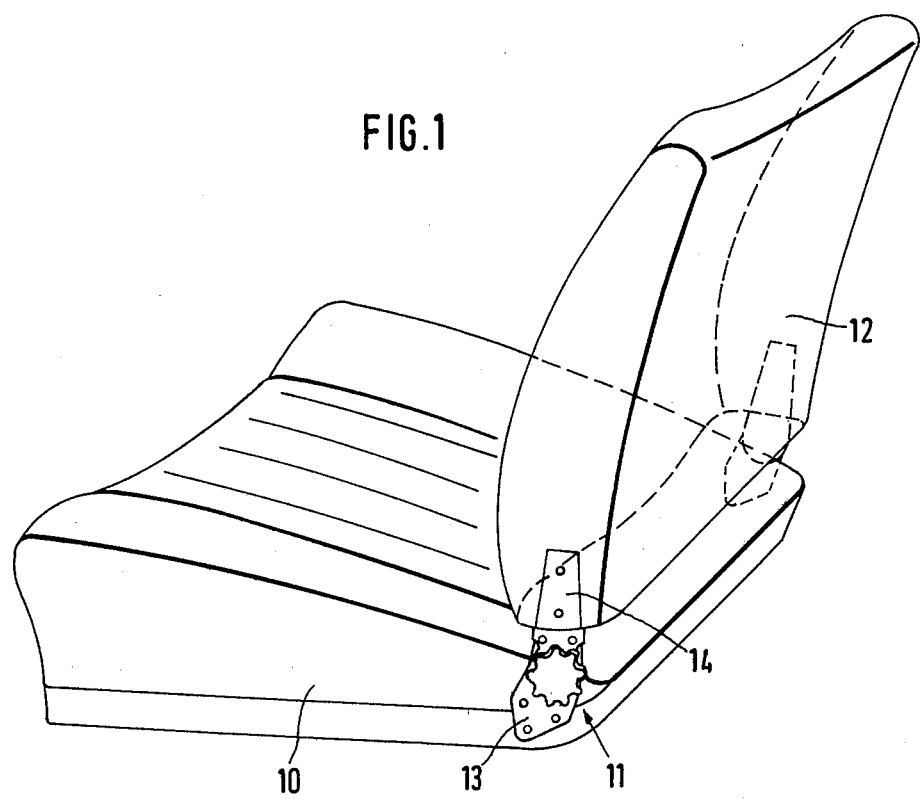
FIG. 1 is a perspective view of a motor vehicle seat having a reclinable seat back secured to the seat proper by an adjustable hinge mount incorporating this invention.

FIG. 1 illustrates a motor vehicle seat having a seat part 10 and a seat back 12 tiltably connected to the seat part by an adjustable hinge mount 11 secured at least at one lateral side of the seat. The hinge mount 11 is constituted of a hinge member 13 assigned to the seat part 10 and a hinge member 14 assigned to the seat back 12. In the shown exemplary embodiment the two hinge mounts 13 and 14 are fastened to the seat by screw bolts or by welding.

As seen from FIGS. 3–6, both the hinge member 13 and the hinge member 14 have overlapping circular portions 15 and 16 provided respectively with recessed portions 17 and 18. The recessed portion 17 of the hinge member 13 is formed with external teeth 19 whereas the recessed portion 18 in the circular part 16 of the hinge member 14 is shaped with internal teeth extending on its inner periphery. The number of external teeth 19 is at least about one tooth less than the number of the internal teeth 20 and the diameter of the crown circle of the internal teeth 20. In addition, the center of the spur gear formed by the external teeth 19 on the periphery of the recessed portion 17 has a bore 21 whereas the recessed portion 18 forming the internal gear with internal teeth 20 is provided with a concentric bore 22. In order to keep the external teeth 19 of the hinge member 13 in engagement with the internal teeth 20 of the hinge member 14 on the one hand, and to make possible the relative tilting movement between the two hinge members on the other hand, the bore 21 supports an eccentric portion 24 of a rotary axle 23 whereas the concentric portion 25 of the axle is inserted into the bore 22 to support the hinge member 13. The outwardly projecting end of the axle 23 is shaped on two opposite sides to receive, for example, a nonillustrated hand lever for imparting the rotary movement to the axle 23.

According to this invention, bearing shield 26 which is supported for rotation on the other concentric portion 28 of the axle 23 is at its rim portion firmly connected to the hinge member 14. This connection can be made either by rivet 27 as illustrated by way of example on the left-hand side of FIG. 2 or by welding an angular projection 33 of the shield 26 to the edge of the hinge member 14 as indicated on the right-hand side of FIG. 2 and in FIG. 6. These angular projections 33 embrace both opposite edges of the hinge member 14 and constitute thus additional holders for establishing the axial cohesion of the hinge member. The bearing shield 26 thus forms together with the hinge member 14 a pocket-like receptacle which encloses the other hinge member 13 and fixes the same in the axial direction. As mentioned above, the bearing shield 26 is supported for rotation on the concentric portion 28 of axle 23 concentrically to the recessed portion 18 of the hinge member 14. In order to hold the circular portion 15 of the stationary hinge member 13 in a substantially play-free contact with the circular part 16 of the movable hinge member 14, the bearing shield 26 is provided on the level of its bearing sleeve 29 with two diametrically opposed angular arms or projections 30 and 30' which upon compression of the faces of the bearing shield 26 and of the recessed portion 18 of the hinge member 14 against the circular part 15 of the hinge member 13 are welded to the edge of the circular part 16 of the hinge member 14. The compression is made at such a force that practically no axial play between the hinge members and the bearing shield takes place (FIG. 4). The connection by welding insures that the adjusted position of the mating surfaces of respective component parts is reliably maintained. This substantially play-free arrangement is further reinforced by the above-discussed angular arms or projections 33 which are welded to the edges of hinge member 14 simultaneously with the arms or projections 30 and 30'.

The arrangement of the angular holding arms 30 and 30' on the level of rotary axle 23 permit the rotary movement of the hinge member 14 relative to the stationary hinge member 13. Inasmuch as the shield 26 does not engage the lower range of the circular hinge parts 15 and 16, and thus this lower range is not secured against axial play, the stationary hinge member 13 is provided with a guiding cover plate 31 having a Z-shaped cross-section and engaging with its free arm the marginal part of the lower range of the circular part 16 of the hinge member 14. Both lateral sides of the guiding cover plate 31 are provided with bent portions 32 and 32' which overlap the edges of the hinge member 13 and are welded to the latter (FIG. 5). In this manner, the axial fixing of the hinge members is effected on the entire periphery of their circular parts and consequently the engagement of teeth 19 and 20 remains always over the entire width of the teeth.

It will be understood that each of the elements described above, or two or more together, may also find a useful application in other types of constructions differing from the types described above. For example, it is possible to fasten the angular arms 30 and 30' to the hinge member 14 as well as the angular projections 32 and 32' to the hinge member 13 by rivets instead of by welding. In this case it is necessary to make the angular arms 30, 30', 32 and 32' a little longer and the hinge members 14 and 13 have to be provided also with angular pieces so that the two parts be connectable by rivets. In another modification, the angular arms 30, 30', 32 and 32' can be shaped directly on the hinge members 14 and 13 in the form of bulges.

While the invention has been illustrated and described as embodied in a hinge mount for motor vehicle seats, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge mount for a seat having an adjustable seat back, particularly for a motor vehicle seat, the mount including a first hinge member connected to the seat and a second hinge member connected to the seat back, a wobble gear assembly having an inner gear and an outer gear and including a rotary axle interconnecting the two hinge members and having an eccentric portion supported for rotation on one of said hinge members and a concentric portion supporting the other hinge member to adjust via the gears of said assembly the mutual positions of said hinge members, said first hinge member being formed with a recessed circular part constituting the outer gear of said assembly, and said second hinge member being formed with a recessed circular part constituting the inner gear of said assembly, a combination comprising means for holding said hinge members on said axle in a fixed axial position alotted to each other, said holding means including a single bearing shield supported for rotation on said concentric portion of said axle and adjoining substantially without play a surface of said first hinge member, at least one rim portion of said shield being secured to said second hinge member above said recessed circular part thereof, and two diametrically opposed angular arms formed on the periphery of said shield, said arms being arranged on the level of said axle and being secured to the periphery of the recessed circular part of said second hinge member.

2. The combination is defined in claim 1, wherein said angular arms are attached to said second hinge member by welding.

3. The combination as defined in claim 1, wherein said bearing shield is connected to said second hinge member to form therewith a pocket-like receptacle for engaging the upper part of said first hinge member, and said first hinge member being provided with a guiding cover plate for engaging the lower marginal part of said second hinge member.

4. The combination as defined in claim 3, wherein said guiding cover plate extends over the entire width of said first hinge member and is provided on its lateral sides with angular arms secured to said second hinge member by welding.

* * * * *